United States Patent
Reiss et al.

(10) Patent No.: US 9,923,758 B2
(45) Date of Patent: Mar. 20, 2018

(54) ALERT DAMAGE INDEX

(71) Applicant: CA, Inc., New York, NY (US)

(72) Inventors: Andreas Gerhard Reiss, Frankfurt (DE); Martin Janda, Roudnice (CZ); Tomas Kolda, Prague (CZ)

(73) Assignee: CA, Inc., New York, NY (US)

( * ) Notice: Subject to any disclaimer, the term of this patent is extended or adjusted under 35 U.S.C. 154(b) by 252 days.

(21) Appl. No.: 14/788,456

(22) Filed: Jun. 30, 2015

(65) Prior Publication Data
US 2017/0005857 A1    Jan. 5, 2017

(51) Int. Cl.
H04L 12/24    (2006.01)

(52) U.S. Cl.
CPC ................ H04L 41/0609 (2013.01)

(58) Field of Classification Search
CPC . H04L 63/1416; H04L 43/16; H04L 41/0631; H04L 63/1408; H04L 41/0604; H04L 41/0609
USPC .......................................... 709/224
See application file for complete search history.

(56) References Cited

U.S. PATENT DOCUMENTS

| | | | | |
|---|---|---|---|---|
| 8,578,008 B1* | 11/2013 | Sella | ...................... | H04L 49/351 709/221 |
| 8,738,972 B1* | 5/2014 | Bakman | .............. | G06F 11/0712 714/47.1 |
| 2005/0015624 A1* | 1/2005 | Ginter | ...................... | G06F 21/55 726/4 |
| 2007/0050777 A1* | 3/2007 | Hutchinson | ......... | G06F 11/0709 718/104 |
| 2015/0325105 A1* | 11/2015 | Banerjee | ................ | G08B 29/20 340/506 |

* cited by examiner

*Primary Examiner* — Ruolei Zong
(74) *Attorney, Agent, or Firm* — Gilliam IP PLLC (57) ABSTRACT

Numerous alerts may be received by a management system, potentially making it difficult to determine which alerts indicate events that are potentially more harmful. To identify alerts that indicate harmful events, a damage index for each of the alerts may be determined. Determining an alert damage index facilitates the ranking, sorting, or graphical representation of alerts. The alert damage index can indicate the potential damage or harm an event associated with the alert may cause if left unaddressed. For example, a low memory event has the potential to cause an application or server to respond slowly or not at all. The alert damage index may be determined by processing metrics that indicate the potential harm or severity of the event. For example, the alert damage index may be determined by processing an alert duration factor, an alert threshold breach factor, and a component load factor (damage factors).

20 Claims, 4 Drawing Sheets

ALERT DAMAGE INDEX

BACKGROUND

The disclosure generally relates to the field of computer systems, and more particularly to performance management.

Applications or computer systems may include performance monitors that send designated performance metrics (metrics) to a management system. The performance monitors may also compare metrics to thresholds corresponding to the metrics. If a metric exceeds or falls below a threshold, the performance monitor sends an alert to the management system. Multiple alerts generated by the performance monitors may be in effect at any moment and may be displayed by the management system.

SUMMARY

Numerous alerts may be received by a management system, potentially making it difficult to determine which alerts indicate events that are potentially more harmful. To identify alerts that indicate harmful events, a damage index for each of the alerts may be determined. Determining an alert damage index facilitates the ranking, sorting, or graphical representation of alerts. The alert damage index can indicate the potential damage or harm an event associated with the alert may cause if left unaddressed. For example, a low memory event has the potential to cause an application or server to respond slowly or not at all. The alert damage index may be determined by processing metrics that indicate the potential harm or severity of the event. For example, the alert damage index may be determined by processing an alert duration factor, an alert threshold breach factor, and a component load factor.

This summary is a brief summary for the disclosure, and not a comprehensive summary. The purpose of this brief summary is to provide a compact explanation as a preview to the disclosure. This brief summary does not capture the entire disclosure or all embodiments, and should not be used limit claim scope.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to determining an alert damage index for alerts received by an application management system in illustrative examples. But aspects of this disclosure can be applied to determining alert damage indices for alerts received by other systems, such as a storage system, hypervisors, a network management system, etc. In other instances, well-known instruction instances, protocols, structures and techniques have not been shown in detail in order not to obfuscate the description.

Overview

Numerous alerts may be received by a management system, potentially making it difficult to determine which alerts indicate events that are potentially more severe or harmful. To identify alerts that indicate severe or harmful events, a damage index for each of the alerts may be determined. Determining an alert damage index facilitates the ranking, sorting, or graphical representation of alerts. The alert damage index can indicate the potential damage or harm an event associated with the alert may cause if left unaddressed. For example, a low memory event has the potential to cause an application or server to respond slowly or not at all. The alert damage index may be determined by processing metrics that indicate the potential harm or severity of the event. For example, the alert damage index may be determined by processing an alert duration factor, an alert threshold breach factor, and a component load factor (damage factors). The factors may be weighted to configure the impact of each factor in relation to an overall alert damage index value.

Example Illustrations

Figure 1:
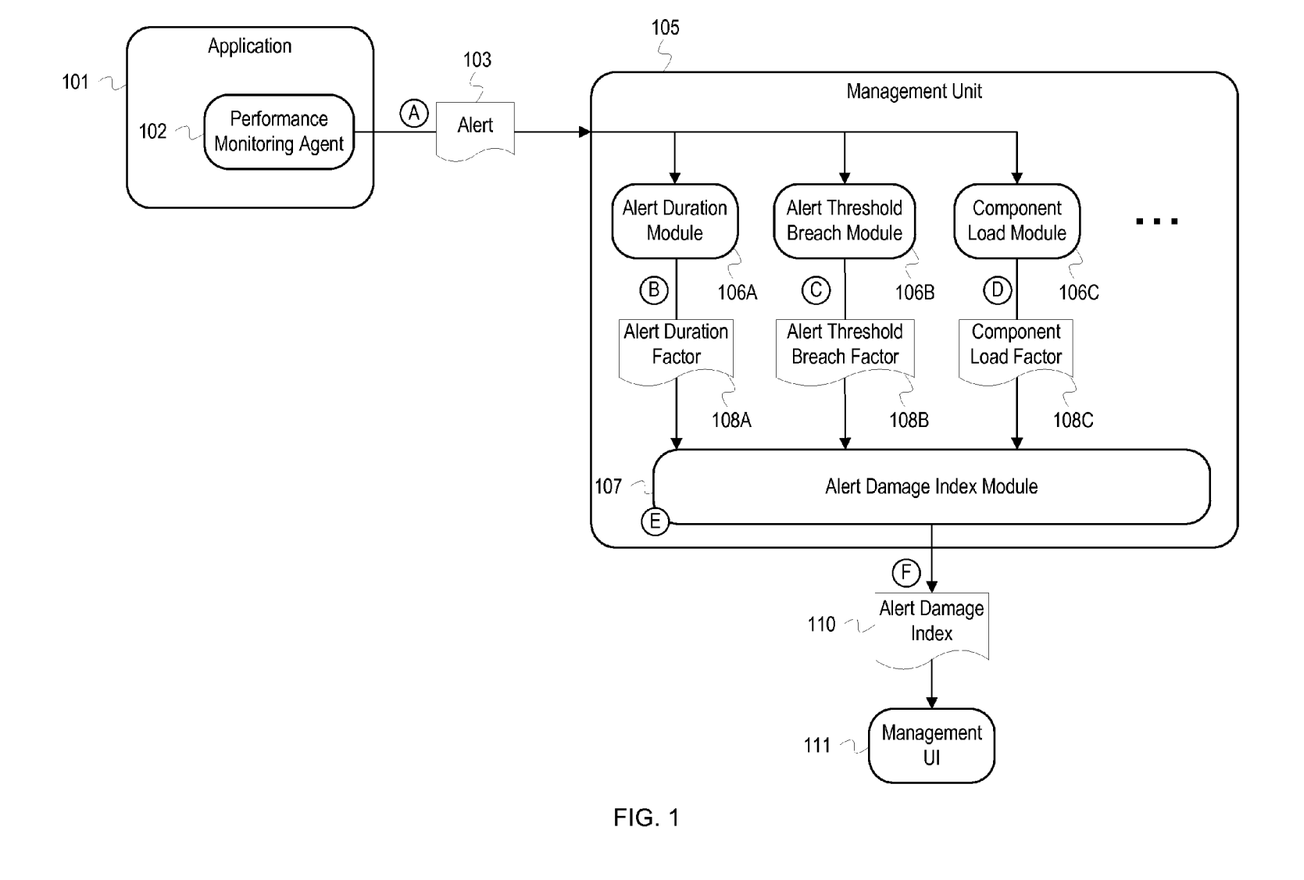
FIG. 1 depicts an example system for computing a damage index for an alert generated by a performance monitor agent.

FIG. 1 depicts an example system for computing a damage index for an alert generated by a performance monitor agent. FIG. 1 depicts an application 101 that includes a performance monitoring agent 102 (agent 102). The agent 102 communicates with a management unit 105 that includes an alert duration module 106A, an alert threshold breach module 106B, a component load module 106C, and an alert damage index module 107. As indicated by the ellipses, the management unit 105 may include additional modules. FIG. 1 also depicts a management user interface 111 (interface 111).

The agent 102 monitors performance of the application 101. The application 101 may be an application running on a server, a virtual machine, etc. The performance of the application 101 is measured using various metrics, such as available memory, number of disk reads/writes per second, number of transactions per second, processor load, etc. At various points during operation, the agent 102 compares the metrics to corresponding thresholds and, if a threshold hold is met, generates an alert. Stages A through F depict a set of operations performed by the management unit 105 and associated components when the agent 102 generates an alert (in particular, the alert 103). Although depicted as a component of the application 101, the agent 102 can be any entity that monitors the performance of the application 101. For example, the application 101 can be an agent itself or the agent 102 can be a separate application.

At stage A, the agent 102 sends the alert 103 to the management unit 105. The alert 103 identifies an event that caused the alert to be generated and includes metrics related to the event. For example, if the available disk space meets a minimum threshold, then the alert 103 indicates a low disk space event and includes metrics related to the low disk space event, such as the amount of disk space remaining, the amount of time which the disk space has been below a threshold, etc. The alert 103 may be a file or data structure that is sent locally or sent over a network such as the Internet. After receiving the alert 103, the management unit 105 may distribute the alert 103 to the modules 106A, 106B, and 106C. Alternatively, the management unit 105 may send selected metrics included in the alert 103 to various modules.

At stage B, the alert duration module 106A determines an alert duration factor 108A based, at least in part, on an alert duration. The alert duration is the length of time that the alert 103 has persisted. For example, if the alert 103 indicates a high number of transactions per second, the duration of the alert 103 is the length of time which the number of transactions has been above a maximum number of transactions. The alert duration may be a metric that is measured by the agent 102 and sent as part of the alert 103. The agent 102 may record the time at which a threshold was breached and then determine the elapsed time before sending the alert 103. Alternatively, the alert duration may be determined by the alert duration module 106A by determining the time elapsed since receiving the alert 103.

The alert duration factor 108A indicates the damage index of the alert in regard to alert duration. In general, the longer the alert duration the more harmful or severe the alert. As the alert duration increases, the value of the alert duration factor 108A increases, indicating greater severity or harmfulness. The alert duration factor 108A may be determined using a linear function, an exponential function, or other technique. When using a function to determine the alert duration factor 108A, the alert duration may be scaled in order to alter the slope of a function used to determine the alert duration factor 108A. For example, the alert duration may be scaled so that the value of the alert duration factor 108A increases more slowly as the alert duration increases. Once determined, the alert duration factor 108A is provided to the alert damage index module 107.

At stage C, the alert threshold breach module 106B determines an alert threshold breach factor 108B. The alert threshold breach factor 108B is based on the amount that a metric associated with the alert 103 breaches or exceeds a threshold. For example, if the alert 103 indicates a low memory event, the alert threshold breach factor 108B is based on the amount by which the available memory metric is below a minimum available memory threshold. The amount by which the threshold is breached may be received as part of the alert 103. Alternatively, the amount by which the threshold is breach may be determined by the alert threshold breach module 106B by comparing the metric which caused the alert 103 to the corresponding threshold.

The alert threshold breach module 106B uses the amount by which a threshold is breached to determine the alert threshold breach factor 108B. The alert threshold breach factor 108B indicates the harm of the alert in regard to the magnitude of the threshold breach. Typically, the greater the amount by which a threshold is breached the more harmful the alert. Thus, the value of the alert threshold breach factor 108B increases as the amount by which the threshold is breached increases.

The alert threshold breach factor 108B may be determined using a linear function, an exponential function, or other technique. When using a function to determine the alert threshold breach factor 108B, the amount by which a threshold is breached may be scaled in order to alter the slope of a function used to determine the alert threshold breach factor 108B. For example, the amount by which a threshold is breached may be scaled so that the value of the alert threshold breach factor 108B increases more quickly as the magnitude of the amount by which a threshold is breached increases. Once determined, the threshold breach factor 108B is provided to the alert damage index module 107.

At stage D, the component load module 106C determines a component load factor 108C. The component load is the number of invocations or responses per interval of a particular component, such as a server, database, application, module of an application, etc. Unlike the alert duration or alert threshold breach, the component load is not specifically related to an event indicated by the alert 103. Instead, the component load corresponds to a component being monitored by a performance monitor agent and for which the performance monitor agent generated an alert. In FIG. 1, the component load is the load of the application 101, as the application 101 caused the agent 102 to generate the alert 103. Because component load measures the load on a particular component, the measurement that represents the component load can vary based on the purpose of the component and other factors. For example, the component load for a web server might be the number of page requests received per minute. The component load for an application component, however, might be the number of invocations per minute. Component load can also be measured by processor utilization, network utilization, etc. Component load for a particular component may include multiple measurements too, such as requests received per minute and processor utilization. Additionally, the component load can comprise a count of effected transactions. For example, transactions involving a database server and an authentication server may flow through a web server. In such an instance, an issue with the web server will affect two transactions, transactions with the database server and transactions with the authentication server. The component load may be a metric that is received as part of the alert 103 or may be read from a different module which monitors the load of the application 101.

The component load module 106C uses the component load to determine the component load factor 108C. The component load factor 108C indicates the severity or harmfulness of the alert in regard to the load of the application 101, i.e. the component affected by the event associated with the alert 103. For example, an alert associated with a component which is rarely used may be less severe than an alert associated with a frequently used component. The component load factor 108C may be determined using a linear function, and exponential function, or other technique. When using a function to determine the component load factor 108C, the component load may be scaled in order to alter the slope of a function used to determine the component load factor 108C. For example, the component load may be scaled so that the value of the component load factor 108C increases more quickly as the component load increases. Once determined, the component load factor 108C is provided to the alert damage index module 107.

At stage E, the alert damage index module 107 determines the alert damage index 110. The alert damage index 110 is determined based, at least in part, on the alert duration factor 108A, the alert threshold breach factor 108B, and the component load factor 108C (factors). The factors may be weighted to emphasize or diminish the effect of one or more factors on the alert damage index 110. For example, the alert threshold breach factor 108B may be given a greater weight than the component load factor 108C or the alert duration factor 108A, causing the value of the alert damage index 110 to be more strongly tied to the value of the alert threshold breach factor 108B. Using example values, the alert threshold breach factor 108B may be multiplied by a weight of 0.6 while the component load factor 108C and the alert duration factor 108A are each multiplied by a weight of 0.2. The alert damage index 110 may be indicated as a percentage, a number in a numerical scale, or a raw number.

At stage F, the alert damage index module 107 transmits the alert damage index 110 to the interface 111. The interface 111 displays received alerts in accordance with associated alert damage indices. The interface 111 may sort, color code, or otherwise modify the graphical representation of alerts according to alert damage indices. The interface 111 is depicted as separate from the management unit 105; however, the interface 111 may be incorporated into the management unit 105. The alert damage index 110 may be transmitted to another system or module in addition to, or instead of, the interface 111. For example, if the application 101 is a virtual machine, the alert damage index 110 may be transmitted to a system designed to manage the application 101, such as a hypervisor. Additionally, the alert damage index 110 may be stored in a database as part of maintaining historical performance data for the application 101.

The description above refers to a number of configurable values, such as performance metric thresholds, scaling values for each of the factors, factor weights used to determine the alert damage index 110, etc. Although not depicted, each of these configurable values may be stored in a central location, such as a database, and read by the various modules. For example, the alert damage index module 107 may read weights used in determining the alert damage index 110. As an additional example, the alert threshold breach module 106B may read thresholds corresponding to metrics used in determining the alert threshold breach factor 108B.

To avoid obfuscating the description, FIG. 1 depicts a single agent 102 communicating with the management unit 105. A system, such as the system depicted in FIG. 1, can include multiple performance monitor agents that monitor multiple applications, servers, components, etc. In such a system, each of the performance monitor agents may communicate with and send alerts to the management unit 105.

FIG. 1 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

Figure 2:
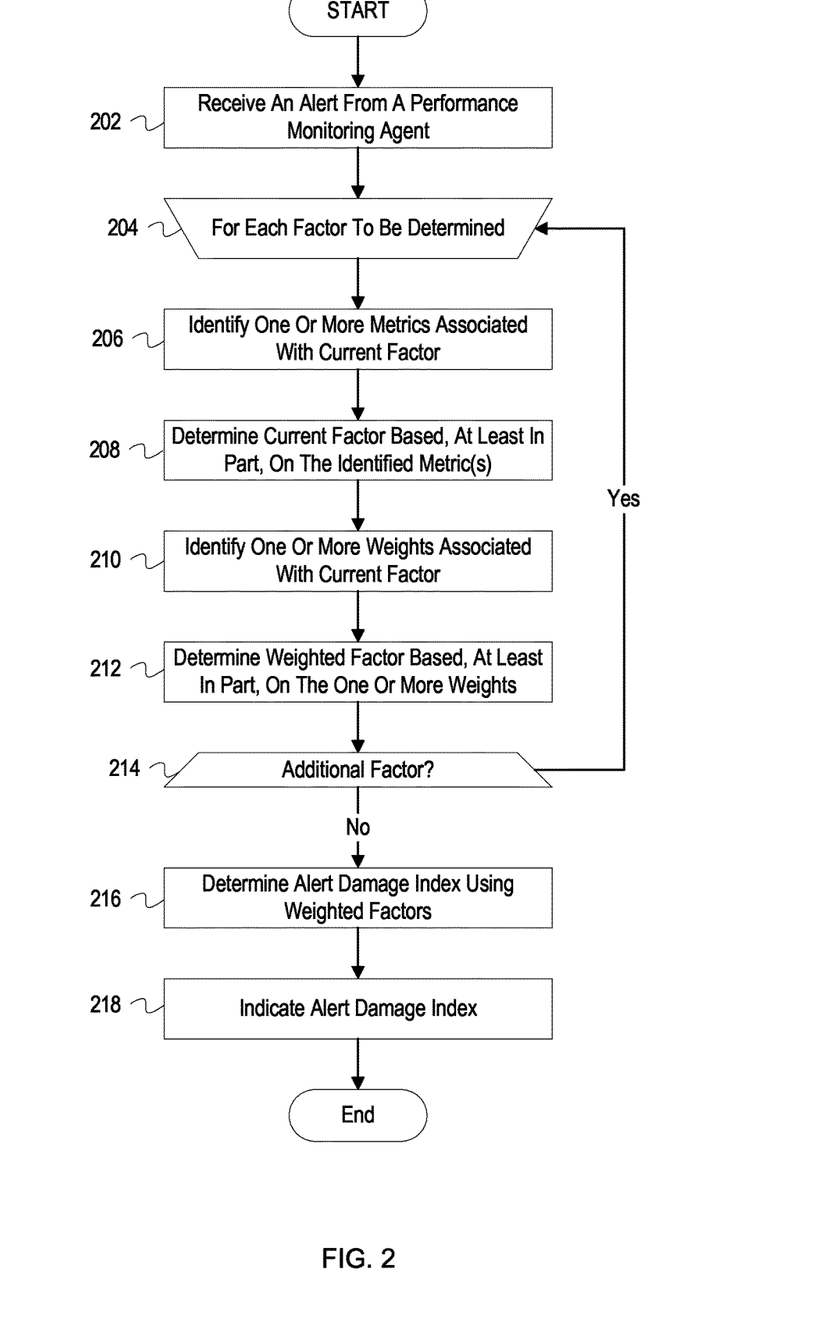
FIG. 2 depicts example operations for determining an alert damage index.

FIG. 2 depicts example operations for determining an alert damage index.

A management unit receives an alert from a performance monitoring agent (202). The alert can be received locally or over a network. The alert can be received using a communication protocol such as the Hypertext Transfer Protocol (HTTP).

A loop for each factor to be determined begins (204). The loop iterates for each factor to be determined such as an alert duration factor, an alert threshold breach factor, and a component load factor. Additional factors may be determined, such as a network bandwidth factor that contributes to an alert damage index relative to the amount of available bandwidth or a processor load factor that contributes to an alert damage index relative to the current processor utilization. The factor being iterated over is referred to as the current factor.

The management unit identifies one or more metrics associated with the current factor (206). The metrics may be received from the performance monitoring agent as part of the alert or may be metrics previously received by the management unit. The metrics associated with the current factor are metrics that are used to determine the current factor. For example, if the current factor is a processor load factor, a processor utilization metric is associated with the processor load factor and is used to determine the processor load factor.

After the management unit identifies metrics associated with the current factor, the management unit determines the current factor based, at least in part, on the identified metrics (208). The current factor may be determined using a linear function, an exponential function, or other technique. The function is evaluated, using the metrics as parameters, to determine the current factor. Additionally, an identified metric may be compared to a series of numerical ranges. The current factor may be determined by identifying the range in which the identified metric falls and determining a value associated with the range.

The management unit identifies one or more weights associated with the current factor (210). A weight is a configurable value used to adjust the impact of a factor on an alert damage index. The current factor may be modified by one or more weights. For example, the current factor may be modified by a weight that scales the current factor in relation to other factors. Also, the current factor may be modified by a weight associated with a particular type of alert. For example, if an alert was generated for an application for which a network bandwidth factor is significant, the network bandwidth factor may be modified by a weight for alerts originating from the application. In some instances, the current factor does not have a weight associated with it, and is thus not modified by a weight.

The management unit determines a weighted factor based, at least in part, on the one or more weights (212). The current factor is modified by the identified one or more weights to determine a weighted factor. For example, a factor may be multiplied or divided by an identified weight, or an identified weight may be added or subtracted from the factor.

The management unit determines if there are any additional factors to be determined (214). If there are any additional factors to be determined, the loop operations beginning at process block 204 repeat for the next factor to be determined.

If there are no additional factors to be determined, the management unit determines an alert damage index using the weighted factors (216). The alert damage index is determined by processing the weighted factors. For example, the weighted factors may be added, multiplied, averaged, etc. As additional example, the sum of the weighted factors may be compared to a sum of weighted factors for other alerts. In such an implementation, the determined alert damage index is the position of the sum of the weighted factors in relation to the other alerts. The alert damage index may be a percentage, a number in a numerical scale, or a raw number. The determined alert damage index may also be weighted in some instances, such as if the alert damage index is above a certain threshold or if the alert originated from a particular application.

The management unit indicates the alert damage index (218). The alert damage index may be indicated locally or over a network. The management unit may indicate the alert damage index to a user interface, a database, an application manager, a hypervisor, etc.

The operations described in FIG. 2 may be repeated for each alert that is received. Additionally, the operations may be repeated for previously received alerts in order to update the alert damage indices. The operations may be repeated upon receiving updated metrics from a performance monitor agent that relate to an existing alert. Also, the operations may be repeated at specified time intervals.

Figure 3:
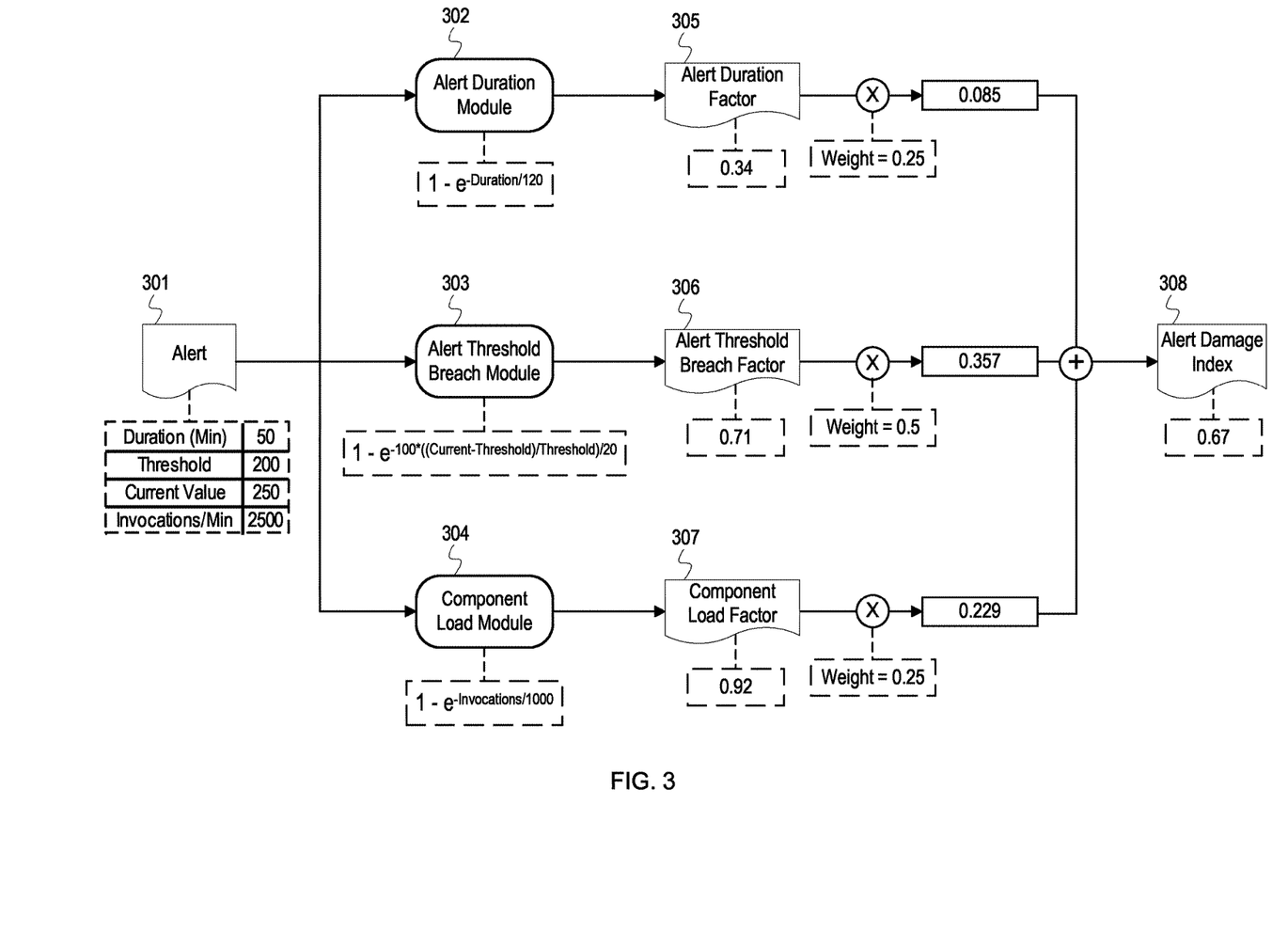
FIG. 3 depicts an example illustration for determining an alert damage index.

FIG. 3 depicts an example illustration for determining an alert damage index. FIG. 3 depicts an alert duration module 302, an alert threshold breach module 303, and a component load module 304. The modules are similar to the modules 106A, 106B, and 106C depicted in FIG. 1.

An alert 301 is an alert generated by a performance monitor agent such as the performance monitor agent 102 of FIG. 1. The alert 301 includes values for metrics related to the alert 301. The metrics are received by or distributed to the modules and used during determination of an alert duration factor 305, an alert threshold breach factor 306, and a component load factor 307.

The alert duration module 302 determines the alert duration factor 305. To determine the alert duration factor 305, the alert duration module 302 may use a function such as the example function depicted in FIG. 3, $1-e^{-Duration/120}$. The function is an exponential function that results in a decimal value between 0 and 1. The function includes an example scaling value of 120 which affects the slope of the function. Increasing the scaling value causes the alert duration factor to increase more slowly as the alert duration rises. Decreasing the scaling value causes the alert duration factor to increase more quickly as the alert duration rises. The alert duration module 302 reads the "Duration" metric from the alert 301 and inputs the metric into the function resulting in the function $1-e^{-50/120}$. The alert duration module 302 evaluates the function to determine the value of the alert duration factor 305. In the FIG. 3 example, the alert duration factor 305 has a value of 0.34, rounded to the nearest hundredth.

The alert threshold breach module 303 determines the alert threshold breach factor 306. To determine the alert threshold breach factor 306, the alert threshold breach module 303 may use a function such as the example function depicted in FIG. 3, $1-e^{-100*((Current\ Value-Threshold)/Threshold)/20}$. The function is an exponential function that results in a decimal value between 0 and 1. The portion of the function 100*((Current Value−Threshold)/Threshold) determines the percentage by which a current value breaches a threshold value. The function includes an example scaling value of 20 which affects the slope of the function. Increasing the scaling value causes the alert threshold breach factor to increase more slowly as the alert threshold breach grows. Decreasing the scaling value causes the alert duration factor to increase more quickly as the alert threshold breach grows. The alert threshold breach module 303 reads the "Current Value" metric and "Threshold" value from the alert 301 and inputs the values into the function resulting in the function $1-e^{-100*((250-200)/200)/20}$. The "Current Value" metric and "Threshold" value relate to the alert 301, i.e. the alert 301 was generated because the "Current Value" metric breached the "Threshold". The "Threshold" value is the threshold associated with the "Current Value" metric and will vary depending upon the metric which caused an alert to be generated. For example, the "Threshold" may be the maximum number of simultaneous users that an application should have, and the "Current Value" metric may be the current number of users. As another example, if the "Current Value" metric is the available disk space, the "Threshold" value may be the minimum available disk space. After inputting the "Current Value" metric and "Threshold" value, the alert threshold breach module 303 evaluates the function to determine the value of the alert threshold breach factor 306. In the FIG. 3 example, the alert threshold breach factor 306 has a value of 0.71, rounded to the nearest hundredth.

The component load module 304 determines the component load factor 307. To determine the component load factor 307, the component load module 304 may use a function such as the example function depicted in FIG. 3, $1-e^{-Invocations/1000}$. The function is an exponential function that results in a decimal value between 0 and 1. The function includes an example scaling value of 1000 which affects the slope of the function. Increasing the scaling value causes the component load factor to increase more slowly as the component load increases. Decreasing the scaling value causes the alert duration factor to increase more quickly as the component load increases. The component load module 304 reads the "Invocations/Min" metric from the alert 301 and inputs the metric into the function resulting in the equation $1-e^{-2500/1000}$. The component load module 304 evaluates the function to determine the value of the component load factor 307. In the FIG. 3 example, the component load factor 307 has a value of 0.92, rounded to the nearest hundredth.

As depicted in FIG. 3, each of the determined factors is multiplied by a weight. The alert duration factor 305 is multiplied by a weight of 0.25, the alert threshold breach factor 306 is multiplied by a weight of 0.5, and the component load factor 307 is multiplied by a weight of 0.25. Because the alert threshold breach factor 306 has the largest weight of the three factors, the value of the alert threshold breach factor 306 will have a greater effect on the alert damage index 308. Once each of the factors is multiplied by their corresponding weight, the weighted factors are processed to determine the alert damage index 308. In the FIG. 3 example, the alert damage index 308 has a value of 0.67, rounded to the nearest hundredth. FIG. 3 depicts processing the weighted factors by adding them together. Equation 1, below, depicts an example equation that can be used to determine the alert damage index 308.

Alert Damage Index=Alert Duration Factor× Weight1+Alert Threshold Breach Factor× Weight2+Component Load Factor×Weight3    Equation 1

The alert damage index 308 may be scaled. For example, the alert damage index 308 may be multiplied by 5 to determine its value on a scale from 0 to 5, e.g. 0.67×5=3.36. The alert damage index 308 may also be represented as a percentage, e.g. 67%. The alert damage index 308 may also be weighted based on the application from which the alert 301 originated. Weighting the alert damage index 308 based on the originating application emphasizes or deemphasizes alerts for that particular application. For example, if a particular application is critical to a system, alert damage indices for alerts originating from the critical application may be multiplied by 2 to increase the damage indices for those alerts.

The example functions depicted in FIG. 3 are all exponential functions. In some implementations, linear functions or other techniques are used to determine factors. For example, the component load factor 307 may be determined using a linear function. To determine the component load factor 307, an array containing the loads of all similar components in an environment is sorted. The position in the array of the component load indicated by the alert 301 may be divided by the total number of loads in the array to determine a percentage value for the component load in relation to all loads in an environment. In other words, the component load factor 307 is equal to the position of the load in the array divided by the total number of loads in the array. As an additional example, the alert duration factor 305 may be determined by comparing the alert duration to a series of ranges, wherein each range is associated with a value for the alert duration factor 305. If the alert duration falls within a range of 30 to 40 minutes, for example, the alert duration factor 305 may have a value of 0.4.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in block 210 of FIG. 2 may be performed outside of the loop operations or not performed. Factors may be weighted during the operations of block 216, or an alert damage index may be determined without applying a weight to the factors. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as factors to be determined. The number of iterations for loop operations may vary. Different techniques for determining factors may require fewer iterations or more iterations. For example, the loop beginning at block 204 in FIG. 2 may not iterate for each of the factors to be determined. The loop may not iterate over factors that are not pertinent to a received alert or for which metrics to determine the factors were not received. Additionally, the loop may exit due to error conditions or other issues.

The alert duration factor may also be determined based on the frequency of which an alert associated with an event is received. If multiple alerts that indicate a similar event have been received, an alert duration module may determine a frequency with which the alerts are occurring. For example, if five low memory alerts are received within a minute, the alert duration module determines that the frequency is five alerts per minute. The alert duration module may determine an alert duration factor based on the frequency.

The description uses the term "performance metrics" to refer to metrics for an application monitored by a performance monitor agent. Although termed "performance metrics," the metrics may be any kind of numerical metrics, non-numerical metrics capable of being translated into numerical values, or other type of quantifiable measurements.

The term "function" as used herein can refer to any type of mapping from one or more input metrics to an output value that may be used as a factor. Functions besides linear and exponential functions may also be used. For example, constant, quadratic, cubic, rational, logarithmic, step, floor, or hyperbolic functions may be used. It should be noted that mapping a metric to a particular value based on the metric falling within a specified range is a type of step function.

The term "alert" as used herein comprises any type of alert, event, notification, warning, etc. Damage indices may be determined for alerts, events, notifications, warnings, etc., using the operations disclosed herein.

The variations described above do not encompass all possible variations, aspects, or features of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
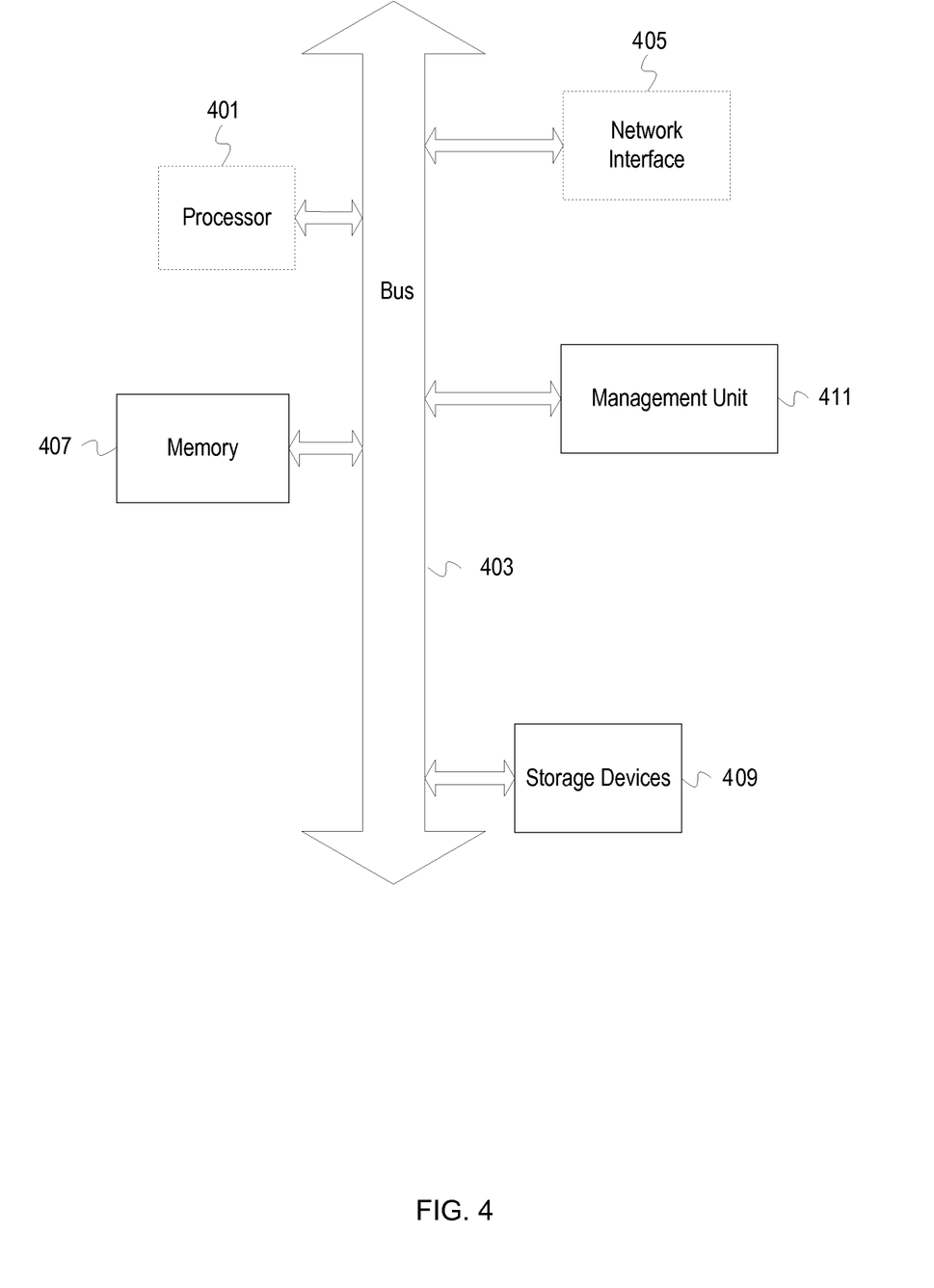
FIG. 4 depicts an example computer system with a management unit.

FIG. 4 depicts an example computer system with a management unit. The computer system includes a processor 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, Hyper-Transport® bus, InfiniBand® bus, NuBus, etc.) and a network interface 405 (e.g., a Fiber Channel interface, an Ethernet interface, an internet small computer system interface, SONET interface, wireless interface, etc.). The system also includes a management unit 411. The management unit 411 determines an alert damage index for alerts received by the management unit 411. Any one of the previously described functionalities may be partially (or entirely) implemented in hardware and/or on the processor 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for determining damage indices of alerts as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. One or more non-transitory machine readable media having program code stored therein, the program code to:
   detect an alert;
   determine an alert duration factor based, at least in part, on a first metric, wherein the alert duration factor indicates potential damage of the alert in proportion to a duration of the alert;
   determine an alert threshold breach factor based, at least in part, on a difference between a second metric and a threshold, wherein the alert threshold breach factor indicates potential damage of the alert in proportion to an amount by which the second metric breaches the threshold;
   identify an application associated with the alert;
   determine a component load factor based, at least in part, on a number of components connected to the application, wherein the component load factor indicates potential damage of the alert based on the number of components which would be affected by failure of the application;
   determine an alert damage index based, at least in part, on the alert duration factor, the alert threshold breach factor, and the component load factor;
   determine whether the application is a critical application;
   based on a determination that the application is a critical application, weight the alert damage index to increase a value of the alert damage index; and
   indicate the weighted alert damage index.

2. The machine readable media of claim 1, wherein the program code to determine the alert threshold breach factor is based on a function comprising $1-e^{-100*((x-y)/y)/z}$, wherein x is the second metric, y is the threshold, and z is a scaling value.

3. The machine readable media of claim 1, wherein the program code to determine the component load factor is based on a function comprising $1-e^{-x/z}$, wherein x is the number of components and z is a scaling value.

4. The machine readable media of claim 1, wherein the program code to indicate the alert damage index comprises program code to:
   send the alert damage index to a user interface;
   rank the alert damage index in relation to other alert damage indices; and
   display, via the user interface, alerts in an order based, at least in part on, a ranking of alert damage indices.

5. A method for determining an alert damage index comprising:
   receiving an alert from a performance monitoring agent which monitors an application, wherein the alert comprises a first metric;
   determining an alert threshold breach factor based, at least in part, on a difference between the first metric and a threshold, wherein the alert threshold breach factor indicates potential damage of the alert in proportion to an amount by which the first metric breaches the threshold;
   determining a component load factor based, at least in part, on a number of components connected to the application, wherein the component load factor indicates potential damage of the alert based on the number of components which would be affected by failure of the application;
   determining an alert damage index based, at least in part, on the alert threshold breach factor and the component load factor;
   based on determining that the application is a critical application, weighting the alert damage index to increase a value of the alert damage index; and
   indicating the alert damage index.

6. The method of claim 5 further comprising:
   determining a duration associated with the alert based, at least in part, on a third metric indicated in the alert; and
   computing an alert duration factor based, at least in part, on a function, wherein the duration is a parameter of the function.

7. The method of claim 6, wherein the function comprises $1-e^{-x/z}$, wherein x is the duration and z is a scaling value.

8. The method of claim 5, wherein determining the alert threshold breach factor is based on a function comprising $1-e^{-100*((x-y)/y)/z}$, wherein x is the first metric, y is the threshold, and z is a scaling value.

9. The method of claim 5, wherein determining the component load factor is based on a function comprising $1-e^{-x/z}$, wherein x is the number of components and z is a scaling value.

10. The method of claim 5 further comprising:
based on receiving an updated alert,
  updating the alert threshold breach factor based, at least in part, on a metric in the updated alert;
  updating the alert damage index based, at least in part, on the updated alert threshold breach factor; and
  indicating the updated alert damage index.

11. The method of claim 5, wherein said indicating the alert damage index comprises:
  sending the alert damage index to a user interface;
  ranking the alert damage index in relation to other alert damage indices; and
  displaying, via the user interface, alerts in an order based, at least in part on, a ranking of alert damage indices.

12. The method of claim 6, wherein the alert damage index is also determined based, at least in part on the alert duration factor.

13. An apparatus for determining an alert damage index comprising:
  a processor; and
  a non-transitory machine readable medium having program code executable by the processor to cause the apparatus to,
    receive an alert from a performance monitoring agent which monitors an application, wherein the alert comprises a first metric;
    determine an alert threshold breach factor based, at least in part, on a difference between the first metric and a threshold, wherein the alert threshold breach factor indicates potential damage of the alert in proportion to an amount by which the first metric breaches the threshold;
    determine a component load factor based, at least in part, on a number of components connected to the application, wherein the component load factor indicates potential damage of the alert based on the number of components which would be affected by failure of the application;
    determine an alert damage index based, at least in part, on the alert threshold breach factor and the component load factor;
    based on a determination that the application is a critical application, weight the alert damage index to increase a value of the alert damage index; and
    indicate the alert damage index.

14. The apparatus of claim 13 further comprising program code executable by the processor to cause the apparatus to:
  determine a duration associated with the alert based, at least in part, on a third metric indicated in the alert; and
  compute an alert duration factor based, at least in part, on a function, wherein the duration is a parameter of the function.

15. The apparatus of claim 14, wherein the function comprises $1-e^{-x/z}$, wherein x is the duration and z is a scaling value.

16. The apparatus of claim 13, wherein the program code executable by the processor to cause the apparatus to determine the alert threshold breach factor is based on a function comprising $1-e^{-100*((x-y)/y)/z}$, wherein x is the first metric, y is the threshold, and z is a scaling value.

17. The apparatus of claim 13, wherein the program code executable by the processor to cause the apparatus to determine the component load factor is based on a function comprising $1-e^{-x/z}$, wherein x is the number of components and z is a scaling value.

18. The apparatus of claim 13, wherein the program code further comprises program code executable by the processor to cause the apparatus to:
  based on receipt of an updated alert,
    update the alert threshold breach factor based, at least in part, on a metric in the updated alert;
    update the alert damage index based, at least in part, on the updated alert threshold breach factor; and
    indicate the updated alert damage index.

19. The apparatus of claim 14, wherein the alert damage index is also determined based, at least in part on the alert duration factor.

20. The apparatus of claim 13, wherein the program code executable by the processor to cause the apparatus to indicate the alert damage index comprises program code executable by the processor to cause the apparatus to:
  send the alert damage index to a user interface;
  rank the alert damage index in relation to other alert damage indices; and
  display, via the user interface, alerts in an order based, at least in part on, a ranking of alert damage indices.

* * * * *